(12) United States Patent
Lin et al.

(10) Patent No.: US 8,890,439 B2
(45) Date of Patent: Nov. 18, 2014

(54) LIGHT-EMITTING DIODE CIRCUIT AND LIGHT-EMITTING DEVICE HAVING THE SAME

(71) Applicants: Lite-On Electronics (Guangzhou) Limited, Guangzhou (CN); Lite-On Technology Corporation, Taipei (TW)

(72) Inventors: Wen-Hsiang Lin, Taipei (TW); Meng-Sung Chou, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 136 days.

(21) Appl. No.: 13/736,429

(22) Filed: Jan. 8, 2013

(65) Prior Publication Data

US 2013/0200794 A1 Aug. 8, 2013

(30) Foreign Application Priority Data

Feb. 6, 2012 (CN) .......................... 2012 1 0024678

(51) Int. Cl.
*H05B 33/08* (2006.01)
*H05B 37/02* (2006.01)

(52) U.S. Cl.
CPC ............ *H05B 37/02* (2013.01); *H05B 33/0809* (2013.01)
USPC ............................. 315/307; 315/191; 315/192

(58) Field of Classification Search
CPC ........ H05B 37/00; H05B 37/02; H05B 33/00; H05B 33/02; H05B 33/08; H05B 33/0824; H05B 33/0827; H05B 33/083; H05B 33/0842
USPC ...................... 315/307, 308, 185 R, 192, 191
See application file for complete search history.

(56) References Cited

U.S. PATENT DOCUMENTS

| | | | |
|---|---|---|---|
| 8,120,283 B2 * | 2/2012 | Tanaka et al. | 315/307 |
| 8,461,770 B2 * | 6/2013 | Ye et al. | 315/291 |
| 2012/0153851 A1 * | 6/2012 | Sauerlaender | 315/192 |
| 2012/0274226 A1 * | 11/2012 | Lee | 315/210 |

* cited by examiner

*Primary Examiner* — David H Vu
(74) *Attorney, Agent, or Firm* — Li & Cai Intellectual Property (USA) Office

(57) ABSTRACT

A light-emitting device includes multiple light-emitting diode units sequentially connected and coupled to a first power source, a switching circuit connected to the light-emitting diode units, a second power source, and a control module. Power provided by the first power source is larger than power provided by the second power source. The second power source is connected to the light-emitting diode units through the switching circuit, which is controlled by the control module to facilitate the delivery of the power of the first power source or the second power source to the light-emitting diode units. When the first power source serves to deliver the power thereof to the light-emitting diode units, the light-emitting diode units may be in a serial conduction. When the second power source serves to deliver the power thereof to the light-emitting diode units, the light-emitting diode units may be in a parallel conduction.

20 Claims, 16 Drawing Sheets

LIGHT-EMITTING DIODE CIRCUIT AND LIGHT-EMITTING DEVICE HAVING THE SAME

BACKGROUND OF THE INVENTION

1. Field of the Invention

The instant disclosure is related to a light-emitting diode circuit, and more particularly to a light-emitting diode circuit capable of operating with at least two different voltage sources and a light-emitting device having the same.

2. Description of Related Art

Traditional emergency lamps having direct current (DC)-based light-emitting diodes (LEDs) incorporated are generally driven by driving circuits for the DC-based light-emitting diodes. Under normal circumstances when the supply of an alternating current (AC) power is not interrupted, a secondary battery of the emergency lamp is charged so that the secondary battery may be used to properly power the DC-based light-emitting diodes when the supply of the AC power is interrupted in the event of an external power outage. Please refer to FIG. 1, which illustrates a circuit block diagram of a traditional DC-based light-emitting device 1 having the DC-based light-emitting diodes. The light-emitting device 1 includes a rectifier 11, a load unit 12, a battery charging circuit 13, an alternating current (AC) voltage detecting circuit 14, and a voltage booster circuit 15. The load unit 12 may include a plurality of the light-emitting diodes. The rectifier 11 is configured to receive an AC voltage and electrically coupled to the load unit 12 and the AC voltage detecting circuit 14. The load unit 12 is further electrically coupled to the battery charging circuit 13 and the voltage booster circuit 15. The booster circuit 15 is electrically coupled to the battery charging circuit 13 and the AC voltage detecting circuit 14.

When the light-emitting device 1 is operated under an external AC power source, if the DC-based LEDs of the load unit 12 are of low voltage driven type (9-24 Volts), the rectifier 11 would be configured to rectify the external AC power to a low voltage ranging from 9 volts to 24 volts, so that the DC-based light-emitting diodes of the load unit 12 may be driven at lower voltage. If the DC-based light-emitting diodes of the load unit 12 are of high voltage driven type (such as a voltage that is larger than 24 volts), the rectifier 11 would need to cooperate with the AC voltage detecting circuit 14 and the voltage booster circuit 15 to drive the DC-based light-emitting diodes of the load unit 12. The secondary battery of the battery charging circuit 13 may be charged while the light-emitting diodes of the load unit 12 are turned on.

On the other hand, when external AC power is not available, if the DC-based light-emitting diodes of the load unit 12 are of low voltage driven type (at a voltage between 3.7 volts to 24 volts), the secondary battery of the battery charging circuit 13 may directly power the DC-based LEDs of the load unit 12 at a lower voltage (3.7-24 volts). If the DC-based light-emitting diodes of the load unit 12 are of high voltage driven type (larger than 24 volts), the power provided by the secondary battery of the battery charging circuit 13 would have to be further boosted up by the voltage booster circuit 15 before the boosted-up power is delivered to drive the light-emitting diodes of the load unit 12. Moreover, the DC-based light-emitting device 1 could be used as a portable light source. When the mobile lighting device is not in connection with the AC power, the secondary battery embedded therein could provide power for driving the light-emitting device 1.

The dual-mode power supply can be implemented by a combination of the rectifier 11 and the voltage booster circuit 15. However, the presence of the rectifier 11 and the voltage booster circuit 15 could complicate the circuitry design of the light-emitting device 1 and also increase the manufacturing cost thereof.

SUMMARY OF THE INSTANT DISCLOSURE

The primary objective of the instant disclosure is to provide a light-emitting diode circuit capable of operating with at least two different power sources of different voltages, and a light-emitting device utilizing the same. The instant disclosure provides a switching circuit capable of switching the inter-connection of a plurality of LED units between series and parallel, thus enabling the light-emitting device to be operated with at least two power sources of different voltages.

The light-emitting device in accordance with the instant disclosure may be operated under two power/voltage modes. The above-mentioned power/voltage modes may respectively correspond to a first power source having a higher voltage (i.e. a high voltage source) and a second power source having a lower voltage (i.e. a low voltage source). When the light-emitting diode units in the light-emitting device are powered by the first power source (the high voltage source), the LED circuit of the instant disclosure may switch the inter-connection of the light-emitting diode units to serial connection mode. When the light-emitting diode units in the light-emitting device are powered by the lower voltage source, the LED circuit of the instant disclosure may switch the inter-connection of the light-emitting diode units to parallel connection mode.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

First Embodiment of the Instant Disclosure

Figure 1:
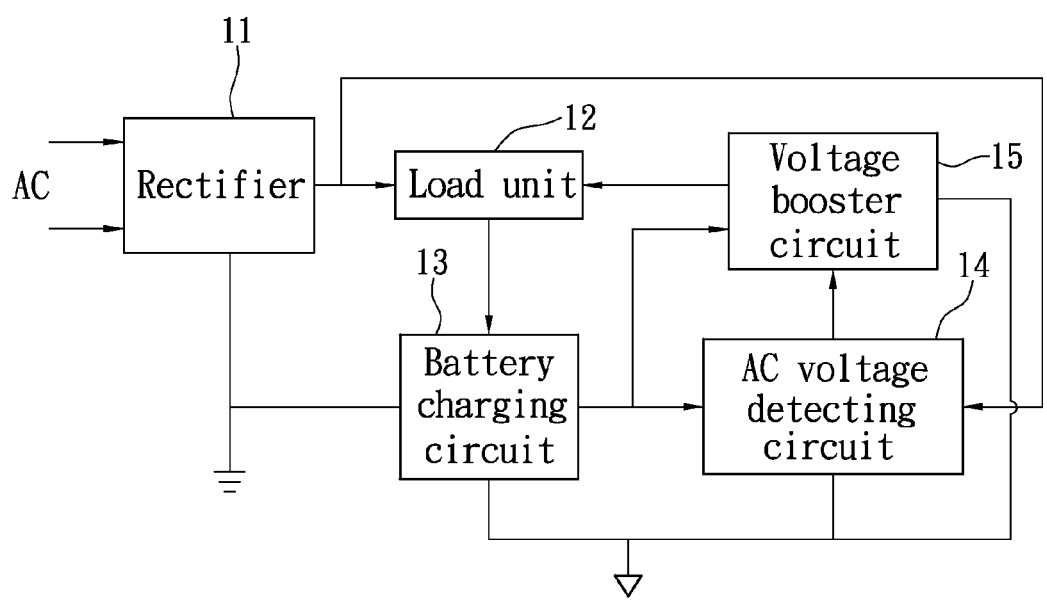
FIG. 1 illustrates a circuit block diagram of a traditional light-emitting device having the DC-based light-emitting diodes.
Figure 2A:
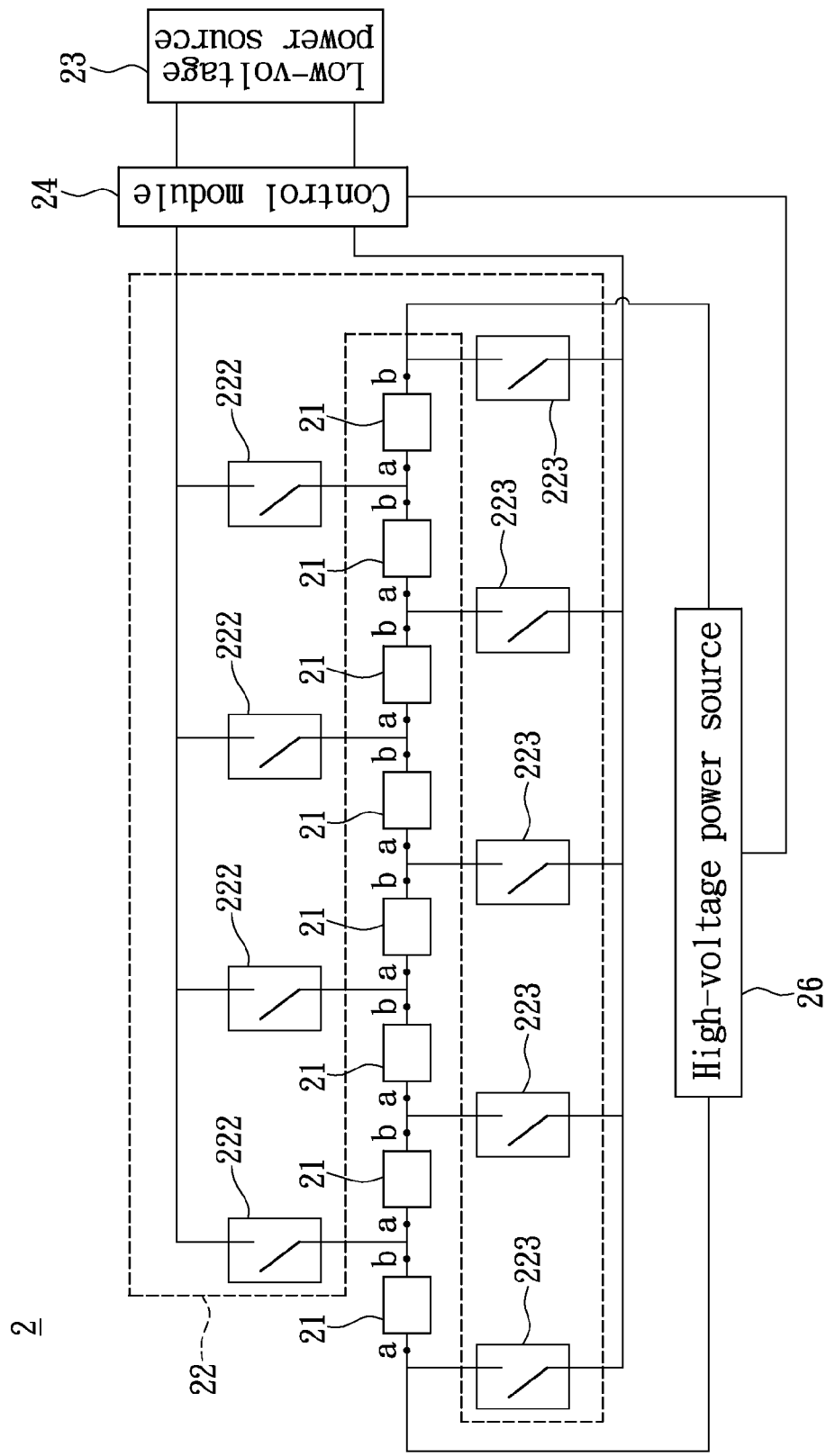
FIG. 2A illustrates a simplified circuit block diagram of a light-emitting device according to the first embodiment of the instant disclosure.

Please refer to FIG. 2A, which illustrates a simplified circuit block diagram of a light-emitting device 2 according to the first embodiment of the instant disclosure. The light-emitting device 2 may include a plurality of light-emitting diode units 21, a switching circuit 22, a low-voltage power source 23 (interchangeably referred to as the second power source), a high-voltage power source 26 (interchangeably referred to as the first power source), and a control module 24. The high-voltage power source 26 provides power at a higher voltage level compared to the low-voltage power source 23. The switching circuit 22 may include a plurality of first switching units 222 and second switching units 223. As shown in FIG. 2A, the number of the light-emitting diode units 21 is eight. However, the number of the light-emitting diode units 21 should not limited to that described this particular exemplary embodiment.

The light-emitting diode units 21 may be sequentially connected and electrically coupled to the high-voltage power source 26. Each of the light-emitting diode units 21 may have a first end "a" and a second end "b." The sequential connection of the light-emitting diode units 21 is achieved by connecting the second end "b" of a first light-emitting diode unit 21 to the first end "a" of a second light-emitting diode unit 21, as shown in FIG. 2A The switching circuit 22 may be electrically connected to the light-emitting diode units 21, with the first and the second switch units 222/223 being alternatively connected between the sequentially arranged LED units 21. The low-voltage power source 23 is electrically coupled to the light-emitting diode units 21 through the switching circuit 22.

The control module 24 may be electrically coupled to the high-voltage power source 26. The switch units 222/223 may be connected to the low-voltage power source 23 through the control module 24. It is worth noting that the arrangement of alternating correspondence between the switch units 222-223 and the light-emitting diode units 21 may be realized in arrangements other than that provided in the example shown in FIG. 2A. For instance, FIG. 4C shows a different arrangement between the switch units 222/223 of the switching circuit 22 and the LED units 21, which will be discussed in further detail in a later section.

The switching circuit 22, the low-voltage power source 23, the high-voltage power source 26, and the control module 24 collectively constitute a driving circuit for the light-emitting diode units 21. At the time of implementing the driving circuit, where the light-emitting diode units 21 may be placed in order to be properly driven by that particular driving circuit could be taken into account as well. Accordingly, more degree of freedom could be obtained in terms of the types of the light-emitting diode units to be driven by the driving circuit. The driving circuit in accordance with the instant disclosure may be adapted to control variety types of LED units. Moreover, the circuit board on which the instant driving circuit is implemented may incorporate a plurality of built-in LED accommodating slots configured to accept variety types of LED units, thus allowing a user to install the LED unit 21 of his/her choice.

Please refer back to FIG. 2A. The light-emitting diode units 21 may be direct current (DC)-based light-emitting diode units or alternating current (AC)-based light-emitting diode units. When DC-based light-emitting diode units are employed, the DC-based LED units may include conventional DC light-emitting diodes or high-voltage light-emitting diodes. When AC-based light-emitting diode units are employed, the AC-based LED units may include bridge rectifier circuit replaced by AC light-emitting diode units, reverse-parallel light-emitting diode units, and the like.

The control module 24 may control the switching circuit 22 so that either the low-voltage power source 23 or the high-voltage power source 26 may be selectively utilized to power the light-emitting diode units 21. When the low-voltage power source 23 is selected to be the preferred power source of the light-emitting diode units 21, the control module 24 may control the switching circuit 22 through respective manipulation of the individual switch units 222/223 thereof, thereby establishing parallel connection between the plurality of sequentially connected light-emitting diode units 21. When the high-voltage power source 26 is selected as the preferred power source for driving the light-emitting diode units 21, the control module 24 may control the switching circuit 22 through manipulation of the respective switch units 222/223 to cause the establishment of serial connection between the plurality of sequentially connected light-emitting diode units 21.

Figure 2B:
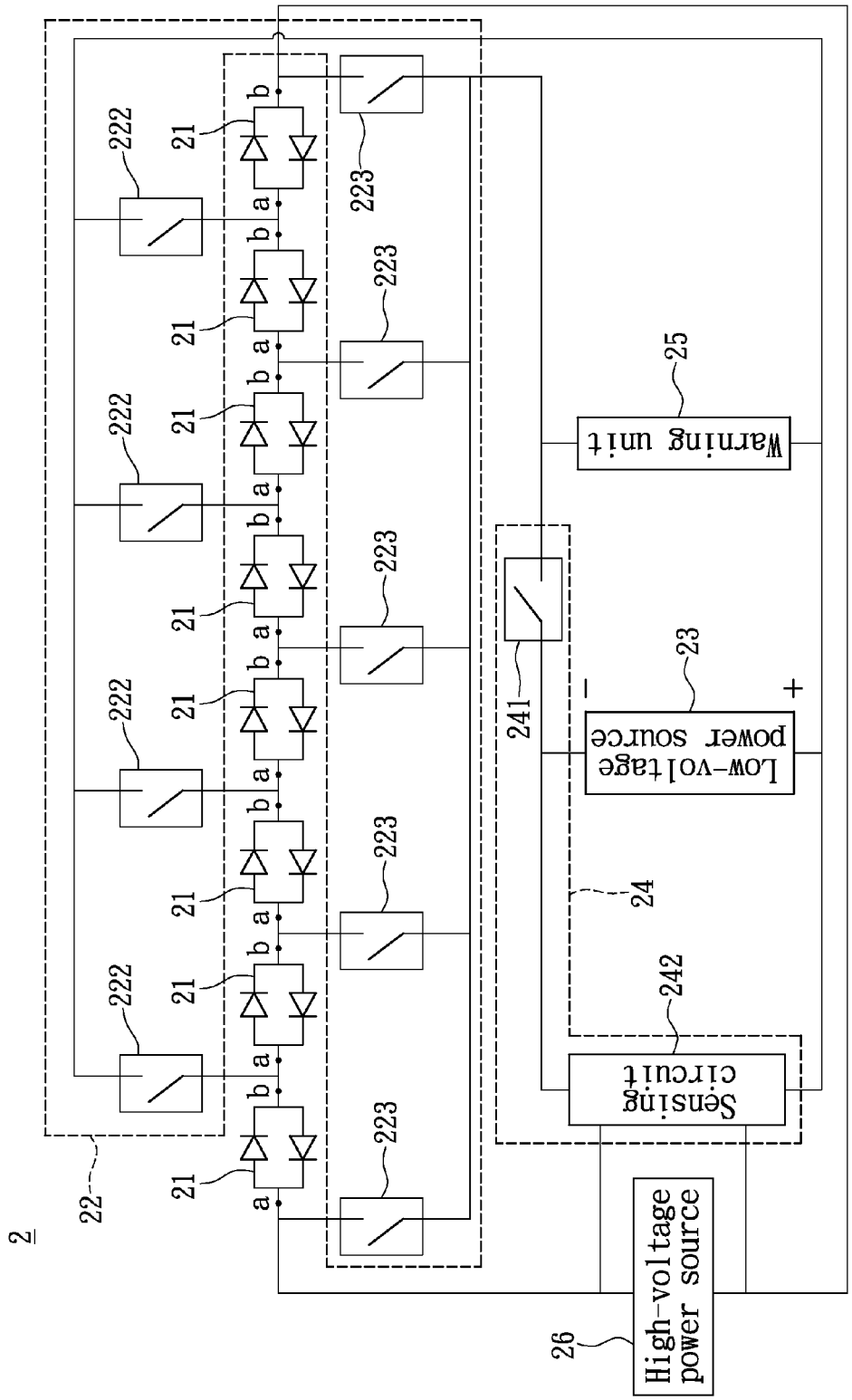
FIG. 2B shows another simplified circuit block diagram of the light-emitting device according to the first embodiment of the instant disclosure.

Please refer to FIG. 2B, which shows another simplified circuit block diagram of the light-emitting device 2 in accordance with the first embodiment of the instant disclosure. The light-emitting device 2 may include a plurality of light-emitting diode units 21, a switching circuit 22, a low-voltage power source 23, a control module 24, a warning unit 25, and a high-voltage power source 26.

The switching circuit 22 includes a plurality of first switching units 222 and a plurality of second switching units 223. The control module 24 includes a switching unit 241 and a sensing circuit 242. Despite the number of the light-emitting diode units 21 is shown to be eight in FIG. 2B, the scope of the instant disclosure as for the number of the light-emitting diode units 21 and the type of the same is not limited thereto.

The light-emitting diode units 21 may be sequentially connected and electrically coupled to the high-voltage power source 26. The switching circuit 22 is electrically connected to the light-emitting diode units 21. The low-voltage power source 23 is electrically coupled to the light-emitting diode units 21 through the switching circuit 22.

The sensing circuit 242 of the control module 24 is electrically connected to the high-voltage power source 26. The switching unit 241 of the control module 24 is coupled between the negative output terminal ("−") of the low-voltage power source 23 and the switching circuit 22. The warning unit 25 is electrically connected to the switching circuit 22. The first switching units 222 are electrically coupled between the positive output terminal (+) of the low-voltage power source 23 and the light-emitting diode units 21. The switching units 223, on the other hand, are electrically coupled between the negative output terminal (−) of the low-voltage power source 23 and the light-emitting diode units 21.

The sensing circuit 242 of the control module 24 may be configured to detect the voltage level of the high-voltage power source 22 thus allowing the control module 24 to control the operation of the switching circuit 22 accordingly. In one implementation, the control module 24 may include a microcontroller (MCU) or a relay, whose sensing circuit 242 is directly coupled to the high-voltage power source 26 to detect the presence of the high-voltage power source 26, e.g. whether the high-voltage power source 26 is available to provide power. Specifically, the switching units 222/223 of the switching circuit 22 may be controlled depending on whether the high-power source 26 is available for delivering power. The high-voltage power source 26 may be an AC power source such as a ubiquitous 220-volt or 110-volt commercial power from a wall outlet, as long as the voltage output level thereof is greater than that of the low-voltage power source 23.

When the sensing circuit 242 detects that the high-voltage power source 26 is unavailable (e.g. fails to continue its delivery of the power), the control module 24 may manipulate the switching units 222/223 to change the connection arrangement between the sequentially connected LED units (e.g. changing the electric connection between the LED units from series connection to parallel connection, or vise versa), thus configuring the LED units into a parallel connection mode that is suitable for functioning under the low-voltage power source 23. The low-voltage power source 23 may be a DC power source that has a positive output terminal (+) and a negative output terminal (−), as shown in FIG. 2B. In one implementation, the low-voltage power source 23 may be a rechargeable battery that is charged by the high-voltage power source 26 through the control module 24 when the high-voltage power source 26 operates routinely (during normal AC/commercial power operation).

When the sensing circuit 242 detects power delivery from the high-voltage power source 26 (under normal operating circumstances, where the AC/commercial power is available), the control module 24 may accordingly manipulate the switching units 222/223 in such a way that a serial connection mode is established between the LED units 21. In this particular example (as depicted in FIG. 2B), the control module 24 can create a parallel connection between the LED units 21 by opening (i.e. turning off) the first and the second switches 222/223, thereby resulting in the establishment of parallel connection mode between the LED units 21. Also in this embodiment, the high-voltage power source 26 is an AC power source from a conventional wall outlet. The sensing circuit 242 may detect the availability of the high-voltage power source 26 through measuring the voltage level or an output power level thereof.

Figure 2C:
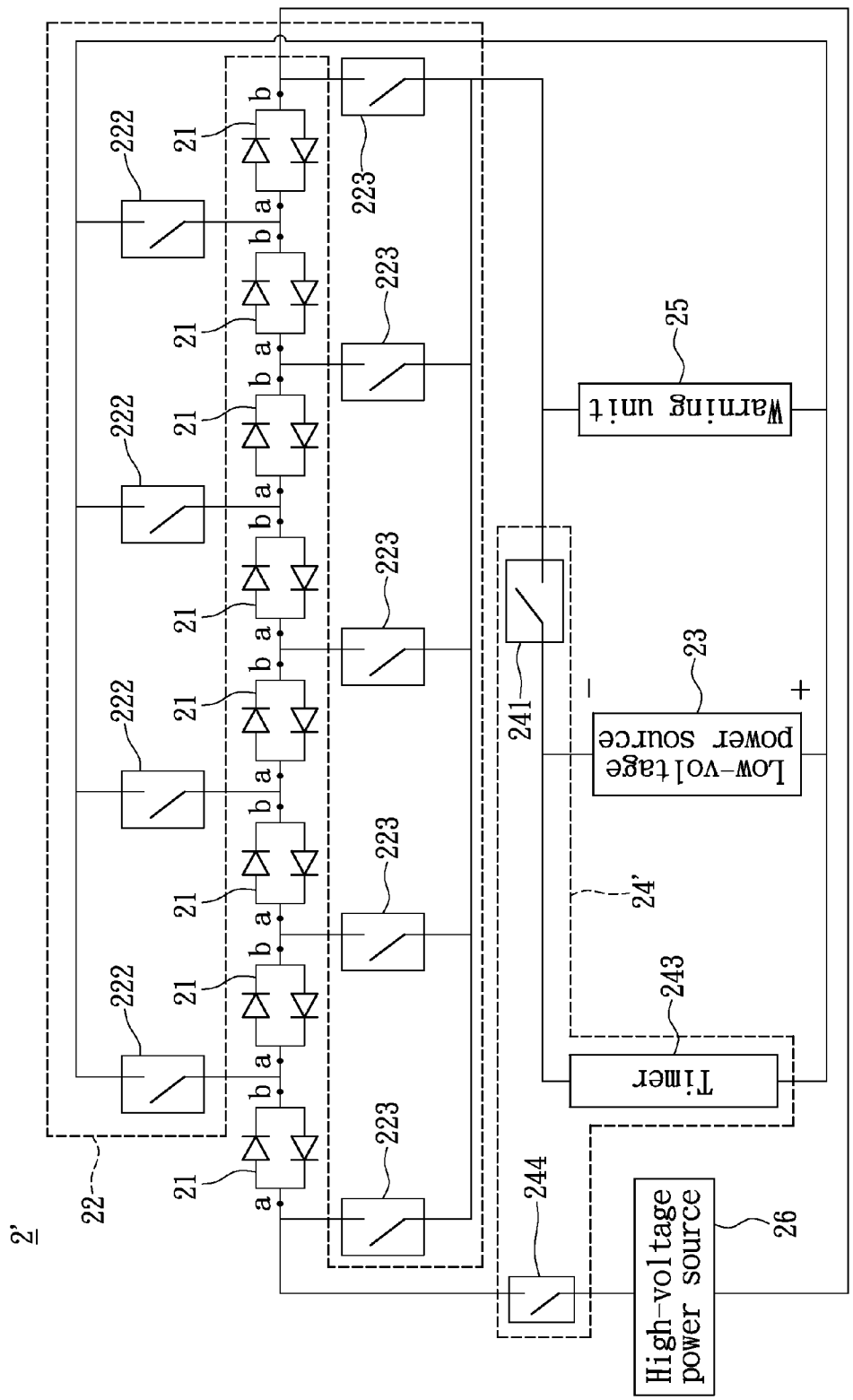
FIG. 2C shows a simplified circuit block diagram of another light-emitting device according to the first embodiment of the instant disclosure.

Please refer to FIG. 2C, which shows a simplified circuit block diagram of a light-emitting device 2' according to another embodiment of the instant disclosure. One difference between the light-emitting device 2' and the light-emitting device 2 discussed in the previous example is the addition of a timer 243. In this example, the control module 24' of the light-emitting device 2' is not configured to sense the voltage level of the high-voltage power source 26. Rather, with the help of the timer 243, the control module 24' can determine when to switch the power supply of the LED units 21 from the high-voltage power source 26 to the low-voltage power source 23 (or vice versa) on a predetermined basis.

In the instant exemplary embodiment, the control module 24' comprises switching units 241, 244, and a timer 243. The control module 24' may control the switching units 241 and 244 according to the configuration of the timer 243. When the switching unit 244 is closed (i.e. turned on), power from the high-voltage power source 26 may be delivered to the LED units 21. On the other hand, when the switching unit 241 is switched on, power from the low-voltage power source 23 may be delivered to the LED units 21. Please note that, the actual implementation and arrangement of the control module 24/24' should not be limited to the specific examples discussed above, as long as the control module 24/24' can serve the purpose of switching the power source of the LED units 21 between the high and low-voltage power sources 26/23. The arrangement of each individual LED unit 21 will be discussed in further detail next, while the connection arrangement between the plurality of LED units 21 will be discussed in a later section.

Figure 3A:
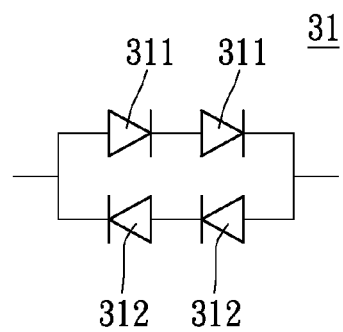
FIG. 3A is a schematic diagram showing the light-emitting diode unit 21 according to the first embodiment of the instant disclosure.

FIG. 3A is a schematic diagram showing the light-emitting diode unit 21 according to the first embodiment of the instant disclosure. Please refer to FIG. 3A in conjunction with FIG. 2B. As previously discussed, the LED unit 21 may be DC-based or AC-based. For DC-based options, the LED units 21 may be conventional DC LED or high-voltage (HV) LED. For AC-based options, the light-emitting diode unit 21 may be bi-directionally conducting diodes in inverse-parallel configuration. For example, each of the light-emitting diode units 21 comprises two light-emitting diodes that are reversely connected in a parallel fashion, as the anode of one light-emitting diode is arranged on the left side while the anode of the other light-emitting diode is arranged on the right side, as shown in FIG. 2B. However, the actual arrangement of the LED unit 21 is not limited to the example depicted above. For instance, in another implementation, as shown in FIG. 3A, a light-emitting diode unit 31 may have two sets of serially connected light-emitting diodes 311 and 312, both of which may be reversely connected in the parallel fashion. It is worth noting that the number of the light-emitting diodes in the light-emitting diode units 21 and 31 may vary from case to case, depending on practical needs or other specific operational requirements.

Figure 3B:
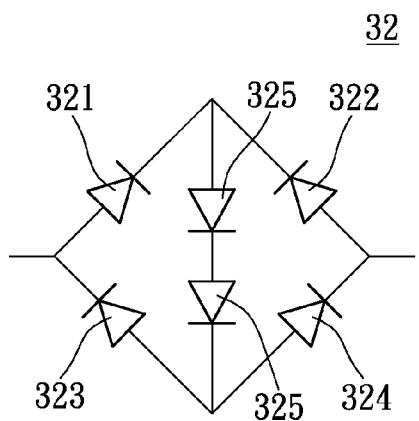
FIG. 3B illustrates a schematic diagram of another light-emitting diode unit according to the first embodiment of the instant disclosure.

FIG. 3B illustrates a schematic diagram of another exemplary configuration for the LED unit according to the first embodiment of the instant disclosure. The light-emitting diode unit 32 may be used in place of the LED unit 21 discussed above. Specifically, the LED unit 32 comprises a bridge light-emitting diode unit that includes light-emitting diodes 321 and 322 with cathodes thereof facing each other to form an upper arm. The bridge light-emitting diode unit 32 may further include light-emitting diodes 323 and 324 having anodes thereof facing each other to form a lower arm, with two serially connected light-emitting diodes 325 also coupled between the cathodes of the light-emitting diodes 321 and 322 and the anodes of the light-emitting diodes 323 and 324. Alternatively, there may be only one light-emitting diode 325 connected between the cathodes of the light-emitting diodes 321 and 322 and the anodes of the light-emitting diodes 323 and 324.

Figure 3C:
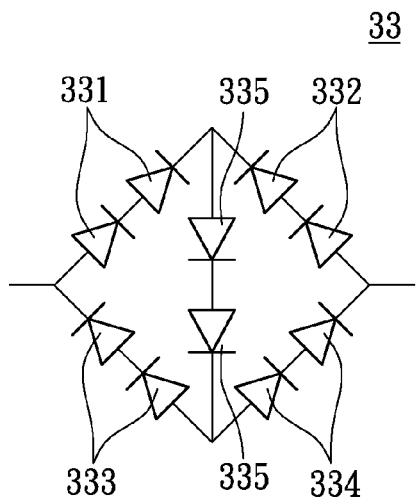
FIG. 3C is a schematic diagram of another light-emitting diode unit according to the first embodiment of the instant disclosure.

Please refer to FIG. 3C in conjunction with FIGS. 2B and 3B. FIG. 3C is a schematic diagram of another exemplary configuration for the LED unit according to the first embodiment of the instant disclosure. The light-emitting diode unit 33 comprises light-emitting diodes 331-335 connected in substantially the same way as the light-emitting diodes 321-325 in the light-emitting diode unit 32. One difference between the light-emitting diode units 32 and 33 is the number of the light-emitting diodes in the upper arm and the lower arm of the light-emitting diode unit.

Figure 4A:
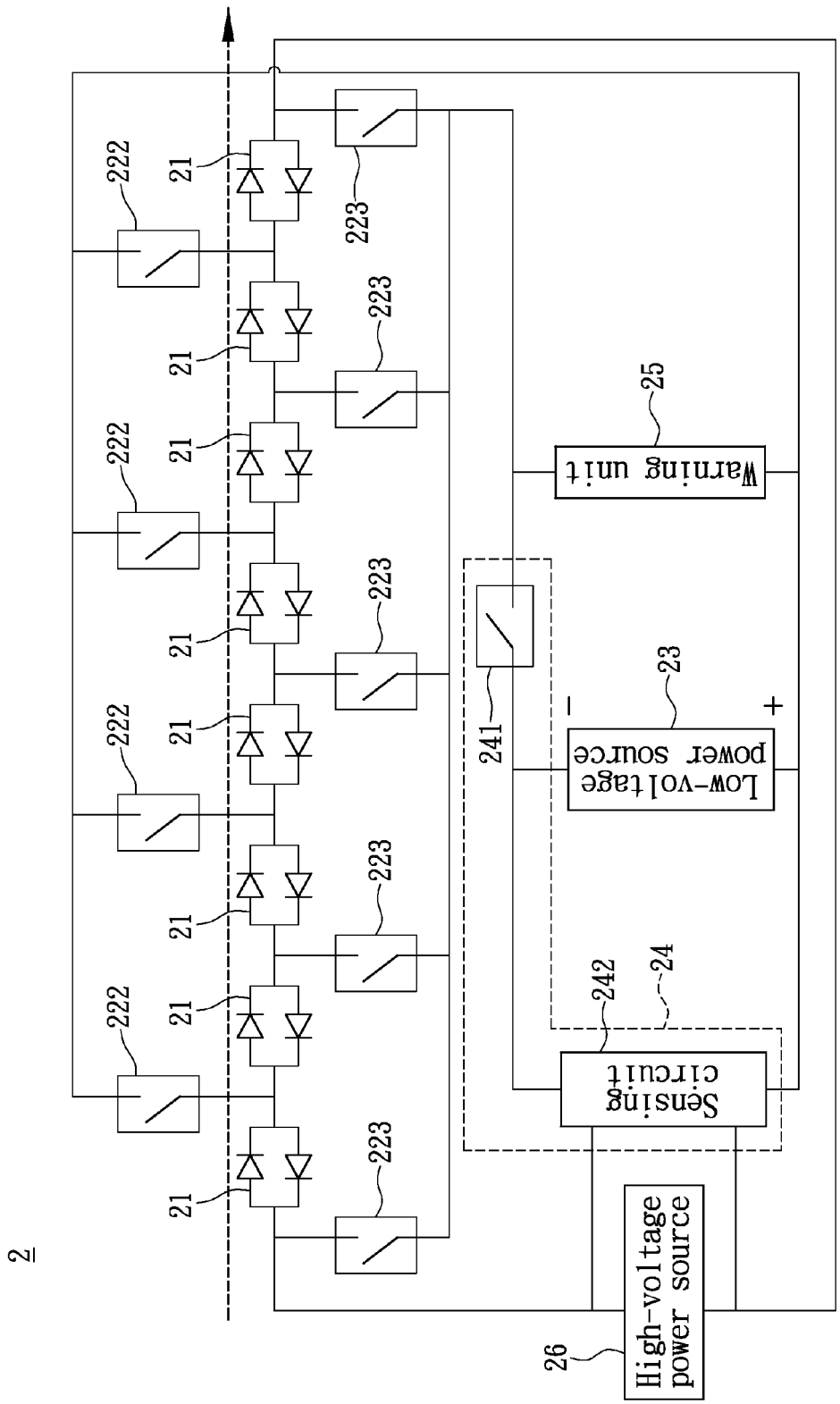
FIG. 4A shows a schematic diagram of the high-voltage power source delivering the power to the light-emitting device according to the first embodiment of the instant disclosure.

Please refer to FIG. 4A, which shows a schematic diagram of the light-emitting device according to the first embodiment of the instant disclosure being powered by the high-voltage power source 26. When the control module 24 detects power delivery from the high-voltage power source 26, the control module 24 manipulates the switches 222, 223 (by opening/switching off the switches) to establish serial connection between the light-emitting diode units 21, thus making the sequentially connected LED units suitable for operating under high voltage conditions. Please note that, the switching unit 241, which is controlled by the sensing circuit 242, is turned off (open) at this time (during "high-voltage" operation mode). Specifically, when the switching unit 241 is switched off during power delivery of the high-voltage power source 26, so that the power of the low-voltage power source 23 is not delivered to the light-emitting diode unit 21 and the warning unit 25.

Figure 4B:
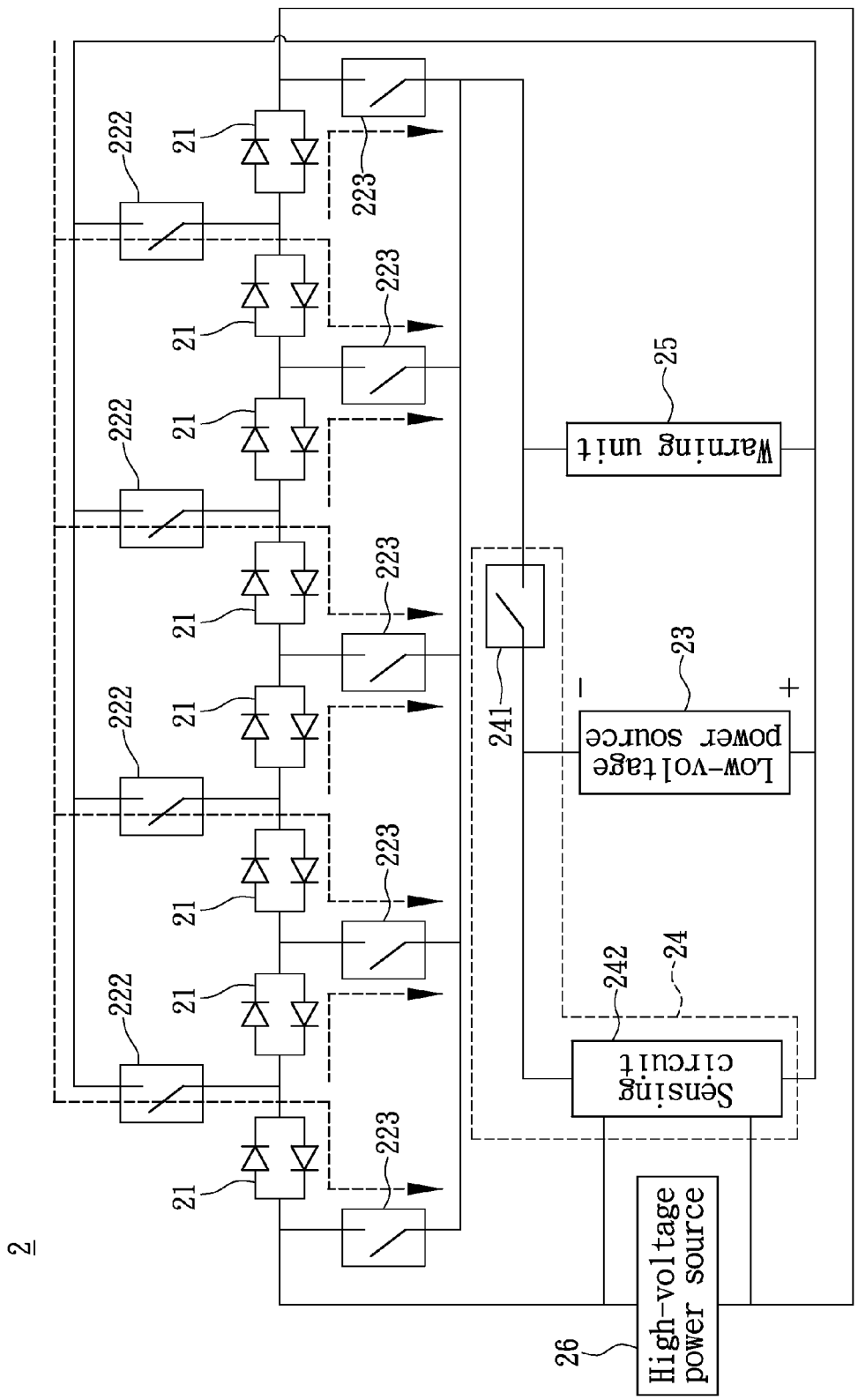
FIG. 4B illustrates a schematic diagram of the low-voltage power source delivering the power to the light-emitting device according to the first embodiment of the instant disclosure.
Figure 4C:
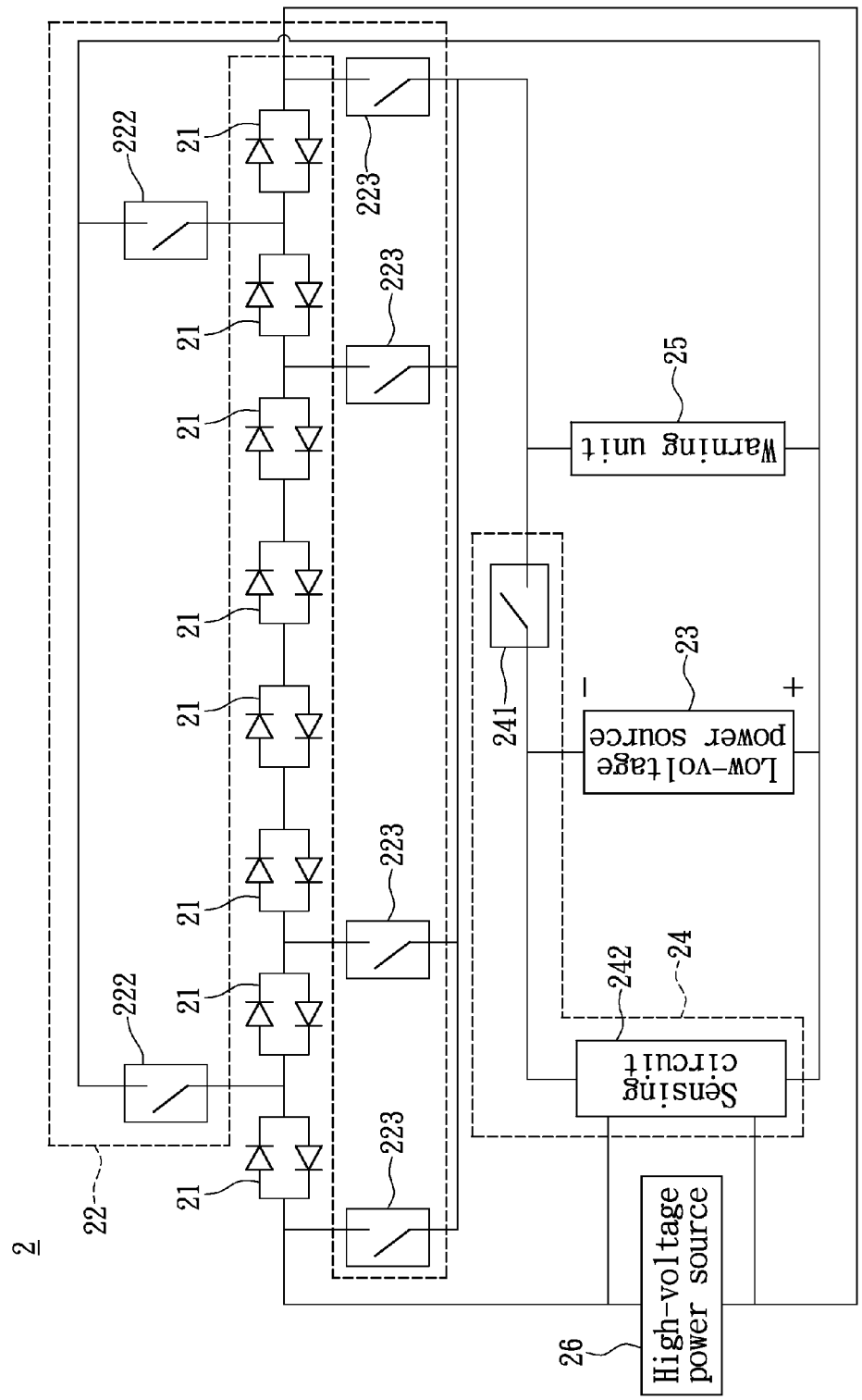
FIG. 4C is a simplified circuit diagram of another light-emitting device according to the first embodiment of the instant disclosure.

Please refer concurrently to FIGS. 2B and 4B. FIG. 4B illustrates a schematic diagram of the light-emitting device according to the first embodiment of the instant disclosure being powered by the low-voltage power source 23. As previously discussed, each of the LED units 21 has a first end (a) and a second end (b); the first end (a) of one light-emitting diode unit 21 is connected to the second end (b) of another light-emitting diode unit 21, thus forming a sequential connection. The first and second switching units 222/223 may be alternatively arranged between adjacent LED units 21. Specifically, the switching circuit 22 may comprise a plurality of first switching units 222 and a plurality of second switching units 223. Each of the first switching units 222 is respectively coupled between the positive output terminal (+) of the low-voltage power source 23 and the first end (a) of an even-numbered light-emitting diode unit 21. Likewise, each of the switching units 223 is respectively coupled between the negative output terminal (−) of the low-voltage power source 23 and the second end (b) of the even-numbered light-emitting diode unit 21. For example, when eight (8) light-emitting diode units 21 are present in FIG. 2B along with four switching units 222 and five switching units 223, each of the switching units 222 may be electrically coupled between the positive output terminal (+) of the low-voltage power source 23 and the first ends (a) of the second/fourth/sixth/eighth light-emitting diode units 21. In one implementation, the leftmost light-emitting diode units 21 may be numbered as the "first" light-emitting diode unit 21, when the light-emitting diode unit 21 on the right to the first light-emitting diode unit 21 may be considered as the "second" light-emitting diode unit. Additionally, four of the five switching units 223 may be coupled between the negative output terminal (−) of the low-voltage power source 23 and the second ends (b) of the second/fourth/sixth/eighth light-emitting diode units 21. The remaining switching unit 21 may be electrically coupled to the first light-emitting diode unit 21. Thus, when the switching units 222 and 223 are switched on (closed), parallel connection is established between the LED units 21. Moreover, since the switching unit 241 of the sensing circuit 242 is also switched on, the low-voltage power source 23 may delivery DC power to drive the LED units 21 (low-voltage operating mode). Please note that, the specific order and arrangement of the switches 222/223 should not be limited to that demonstrated in the instant examples/figures, but rather should depend on practical needs and specific operational requirements.

Since the light-emitting diode units 21 may be bi-directionally conducting, the switching units 222 may be electrically coupled to the positive output terminal (+) of the low-voltage power source 23 while the switching units 223 may be coupled to the negative output terminal (−) of the low-voltage power source 23. Alternatively, the switching units 222 may be electrically coupled to the negative output terminal (−) of the low-voltage power source 23, with the switching units 223 electrically coupled to the positive output terminal (+) of the low-voltage power source 23. In this case, the switching units 223 should be respectively coupled to the positive output terminal (+) of the low-voltage power source 23.

Meanwhile, locations of the first and second switching units 222/223 may be inter-changeable without causing the corresponding light-emitting device to malfunction, so long as the arrangement of the switching units 222-223 could facilitate the power of the low-voltage power source to be delivered to the light-emitting diode units 21 when necessary. Specifically, the switching units 222 may be coupled between the first ends (a) of the odd-numbered light-emitting diode units 21 and the positive output terminal (+) of the low-voltage power source 23. Likewise, the switching units 223 may be coupled between the second ends (b) of the odd-numbered light-emitting diode units 21 and the negative output terminal (−) of the low-voltage power source 23. In short, the switching units 222 and 223 may cooperatively "sandwich" the light-emitting diode units 21 that are electrically coupled to the switching units 222 and 223.

Please refer to FIG. 4C, which shows a simplified circuit diagram of the light-emitting device according to the first embodiment of the instant disclosure. It is worth noting that, the number of the switching units 222-223 may vary so that it is not to be equal to the number of the light-emitting diode units. Thus, in some occasions, not all of the light-emitting diode units 21 are electrically connected to the switching units 222 and 223. In the event that at least one of the switching units 222 or at least one of the switching units 223 has been removed, the power of the low-voltage power source may still be delivered to the light-emitting diode units 21 despite that not every light-emitting diode unit 21 is conducted. In other words, the number of the light-emitting diode units that are in the parallel connection configuration may be less than the number of the light-emitting diode units in the serial connection configuration. As shown in FIG. 4C, when two switching units 222 and one switching unit 223 are removed, the light-emitting device 2 with four light-emitting diode units 21 capable of being in the parallel conduction may stay without being removed. The four light-emitting diode units 21 may include two light-emitting diode units on the left and two light-emitting diode units on the right. With the reduced number of the light-emitting diode units 21 in the parallel conduction, the power consumption of the low-voltage power source could be reduced accordingly.

In addition, when the control module 24 detects unavailability/interruption of power delivery from the high-voltage power source 26, the warning unit 25 may be triggered under power of the low-voltage power source 23 to generate a warning signal for prompting human operators. In one implementation, warning signal may be in the form of sounding a siren. On the other hand, when the high-voltage power source 26 is available, the warning unit 25 receives no power from the low-voltage power source 23 and therefore remains un-triggered.

Figure 4D:
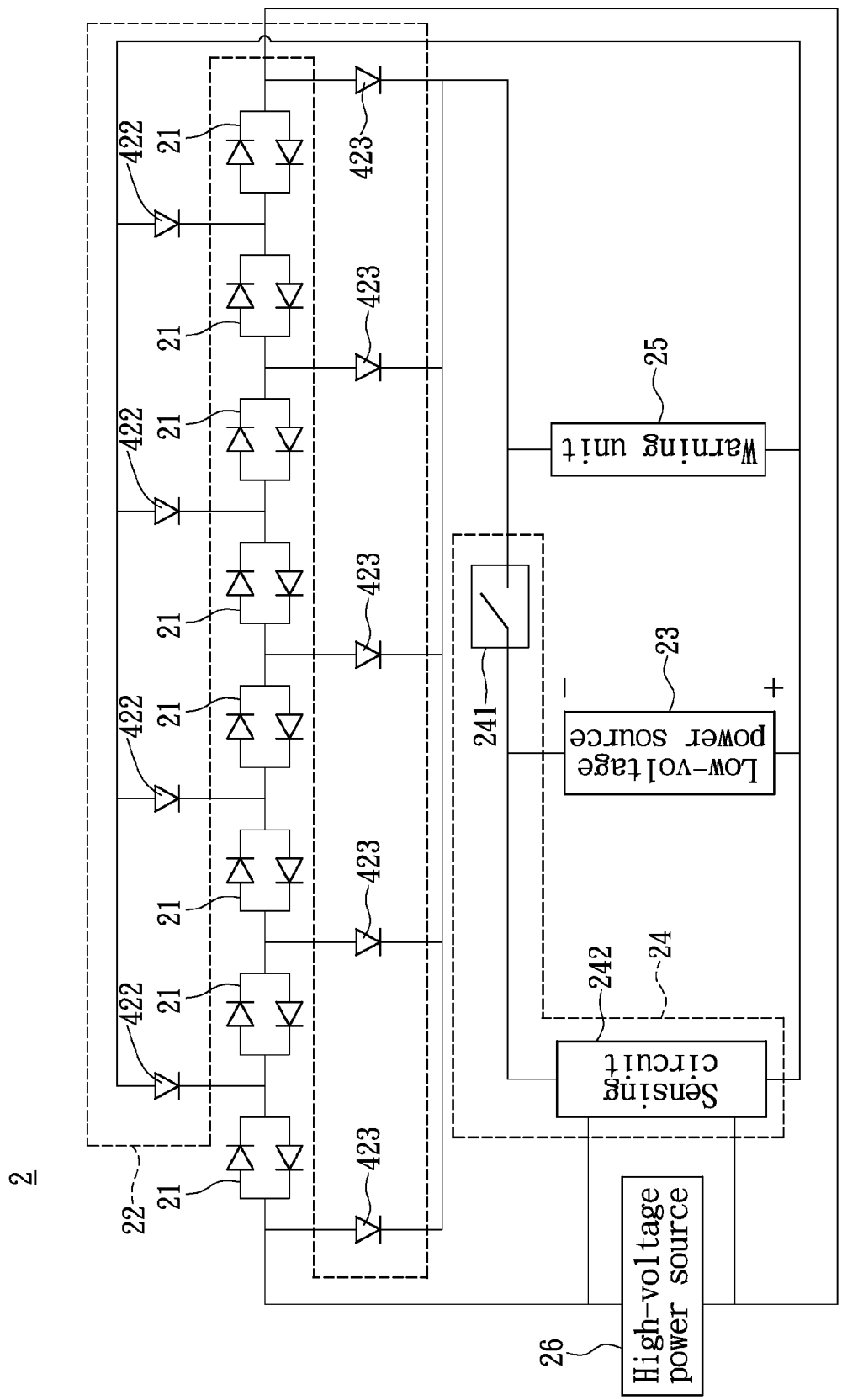
FIG. 4D illustrates a simplified circuit diagram of another light-emitting device according to the first embodiment of the instant disclosure.

Please refer to FIG. 4D, which illustrates a simplified circuit diagram of another light-emitting device 4 according to the first embodiment of the instant disclosure. Substantially similar to the light-emitting device 2, the light-emitting device 4 may replace the switching units 222-223 at the light-emitting device 2 with light-emitting diodes 422-423. When the switching unit 241 is switched on (closed), the light-emitting diodes 422-423 could be conducted as well. For the purpose of prompting the human operators that the high-voltage power source fails to function normally, the light-emitting diodes 422-423 may emit lights with different color when compared with the color of the lights emitted by the light-emitting diode units 21.

Second Embodiment

Figure 5A:
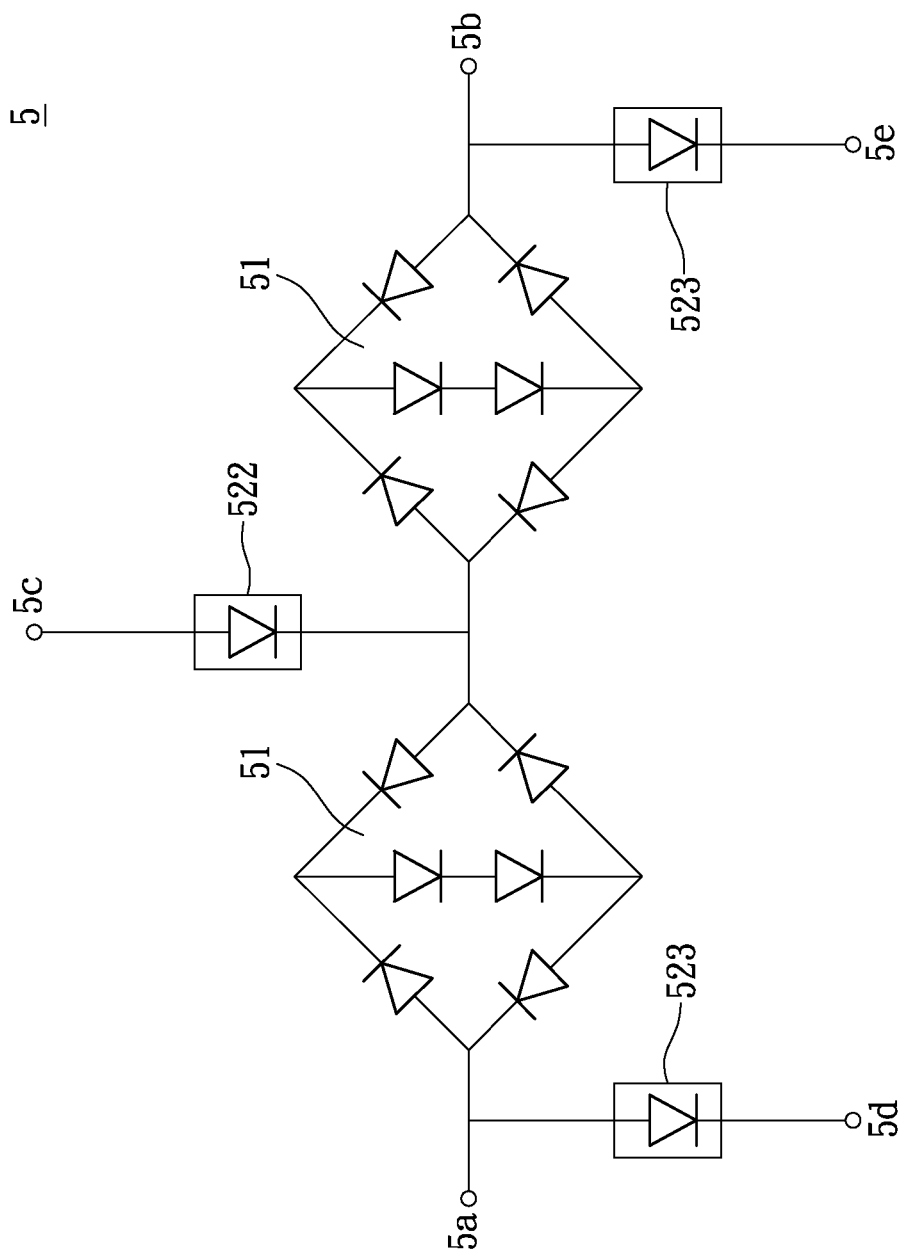
FIG. 5A is a simplified circuit diagram of the light-emitting diode units according to the second embodiment of the instant disclosure.

FIG. 5A is a simplified circuit diagram of a light-emitting circuit 5 according to the second embodiment of the instant disclosure. The light-emitting circuit 5 may include two LED units 51 and three switching units 522. The two LED units 51 may be sequentially connected and electrically coupled to a first power source (not shown) through terminals 5a and 5b. The two LED units 51 and the three switching units 522 may be placed in an interleaving manner. Specifically, one light-emitting diode unit 51 may be coupled between two switching units 522 and therefore the two light-emitting diode units 51 may be coupled to a second power source (not shown) through terminals 5c, 5d, and 5e of the three switching units 522. In one implementation, the first power source and the second power source may correspond to a high-voltage power source and a low-voltage power source, respectively.

Figure 5B:
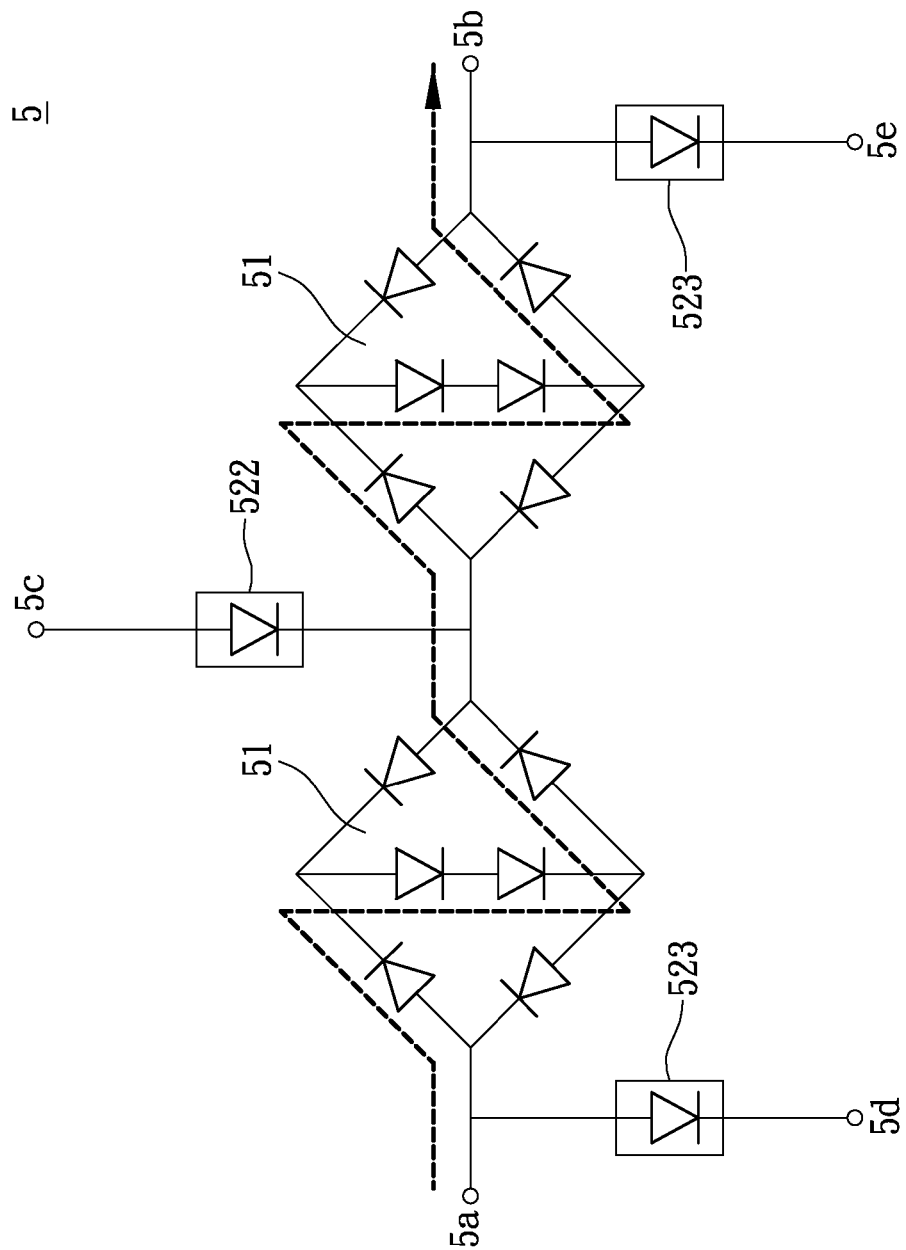
FIG. 5B illustrates the light-emitting diode units powered by the first power source according to the second embodiment of the instant disclosure.
Figure 5C:
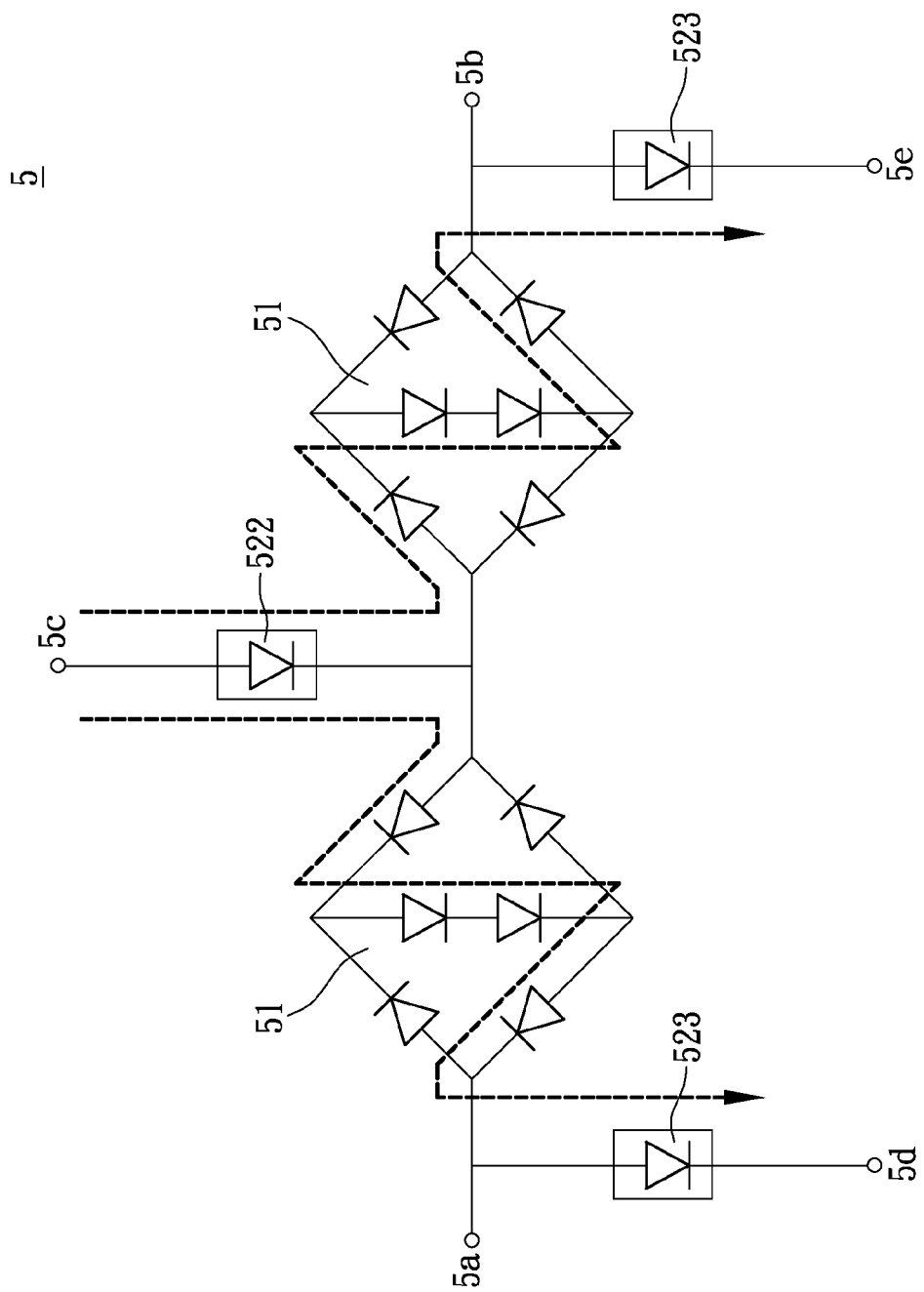
FIG. 5C shows the light-emitting diode units powered by the second power source according to the second embodiment of the instant disclosure.

Please concurrently refer to FIGS. 5B and 5C. FIG. 5B illustrates the first power source (i.e. a high voltage source) powering the light-emitting diode units according to the second embodiment of the instant disclosure, and FIG. 5C shows the second power source (i.e. a low voltage source) delivering the power to the light-emitting diode units according to the second embodiment of the instant disclosure. The dotted lines in FIG. 5B indicate a power transmission path for the two light-emitting diode units that are in a serial connection mode, when dotted lines in FIG. 5C show a power transmission path for the two light-emitting diode units that are in a parallel connection mode. When the first power source with the higher voltage level delivers the power to the two light-emitting diode units, they are in the serial connection mode. And when the second power source with the lower voltage level delivers the power to the two light-emitting diode units, they are in the parallel connection mode. The light-emitting diode device may further include a control module (not shown) capable of manipulating the power source either from the first power source or from the second power source to be delivered to the light-emitting diode units by means of the switching circuit.

In general, the light-emitting circuit 5 may expand to include N LED units and N+1 switching units, wherein N is an integer equal to or larger than two. The N LED units may be sequentially connected and electrically coupled to the first power source while the N LED units and the N+1 switching units are interleaving. The N LED units may be coupled to the second power source through the N+1 switching units. When the first power source is the power source for the N LED units, the LED units are in serial connection mode. In contrast, when the second power source is the power source for the N LED units, the N LED units are in the parallel connection mode.

Third Embodiment

Figure 6A:
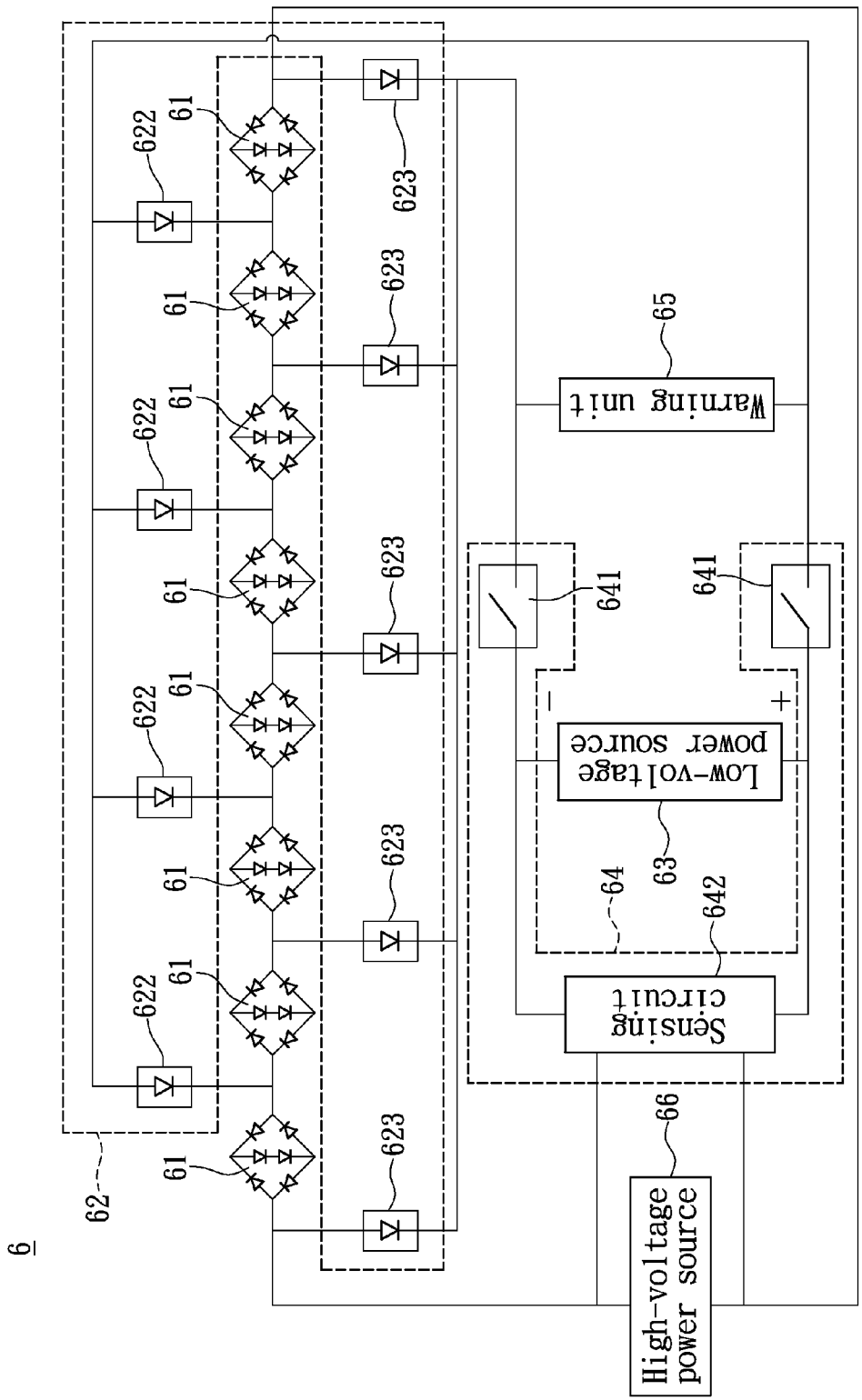
FIG. 6A is a simplified circuit diagram of a light-emitting device according to the third embodiment of the instant disclosure.

Please refer to FIG. 6A in conjunction with FIG. 2B. FIG. 6A is a simplified circuit diagram of a light-emitting device 6 according to the third embodiment of the instant disclosure. The light-emitting device 6 may include a plurality of light-emitting diode units 61, a switching circuit 62, a low-voltage power source 63, a control module 64 and a warning unit 65. The switching circuit 62 may further include multiple light-emitting diodes 622-623. In one implementation, the number of the light-emitting diode units is eight. The third embodiment is substantially similar to the light-emitting device 2 in FIG. 2B, except that the light-emitting device 6 may replace the switching units 222-223 with the light-emitting diodes 622, 623. The anodes of the light-emitting diodes 622 may correspond to the first ends of the switching units 222, while cathodes of the light-emitting diodes 622 may correspond to the second ends of the switching units 222. Meanwhile, cathodes of the light-emitting diodes 623 may be the first ends of the switching units 623 with anodes of the light-emitting diodes 623 considered as the equivalent of the second ends of the switching units 623.

The control module 64 may be implemented in the form of a relay. And the relay may have a sensing circuit 641 connected to a high-voltage power source 66, and a switching unit 641. The switching unit 641 may be controlled by the sensing circuit 642, which may sense a voltage level of the high-voltage power source before controlling whether to switch the switching circuit 62 through the switching unit 641. Consequently, the light-emitting diode units 61 may be selectively configured into a parallel connection mode or in a serial connection mode. When the sensing circuit 642 detects the high-voltage power source 66 is no longer available, the switching unit 641 is conducted, further conducting the light-emitting diodes 622-623. In one implementation, detecting the unavailability of the high-voltage power source 66 is on basis of whether the voltage of the high-voltage power source 66 remains below a predetermined voltage level (e.g., zero volt) for a predetermined period, in which event the switching unit 641 of the relay is conducted.

Figure 6B:
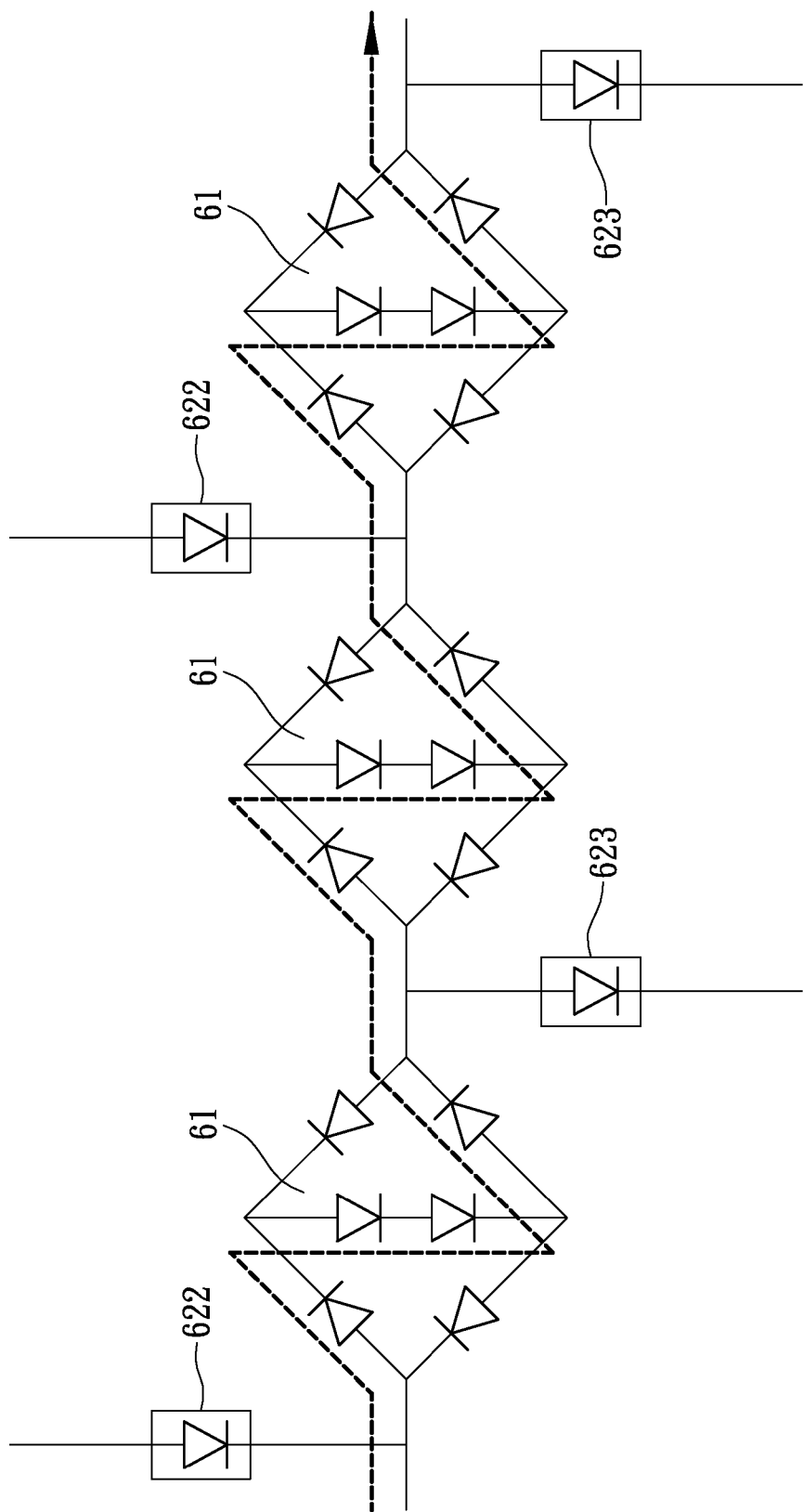
FIG. 6B is a schematic diagram showing the light-emitting diode units powered by the high-voltage power source according to the third embodiment of the instant disclosure.
Figure 6C:
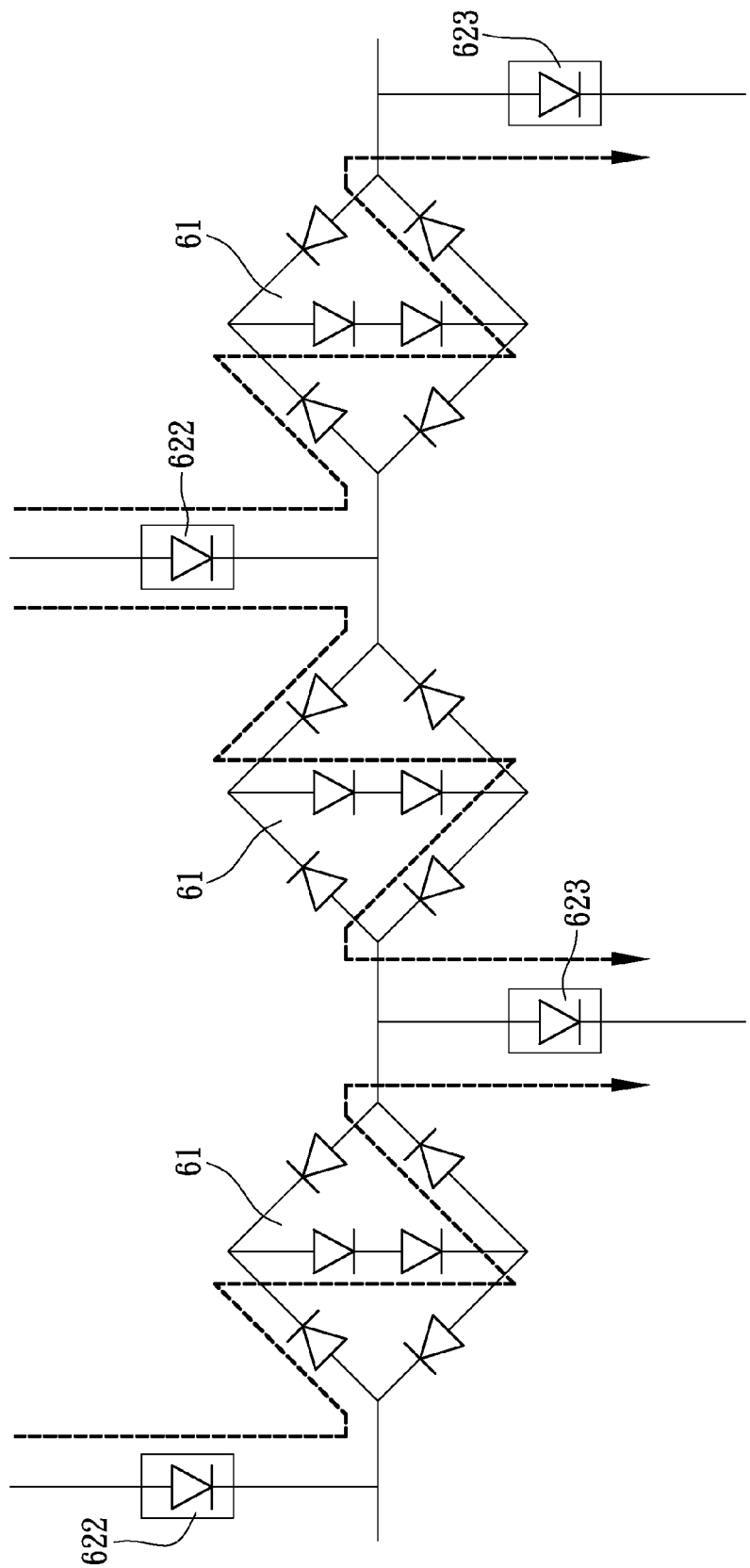
FIG. 6C indicates the light-emitting diode units powered by the low-voltage power source according to the third embodiment of the instant disclosure.

Please concurrently refer to FIGS. 6A, 6B, and 6C. FIG. 6B is a schematic diagram showing the light-emitting diode units according to the third embodiment of the instant disclosure being powered by the high-voltage power source, while FIG. 6C shows the light-emitting diode units according to the third embodiment of the instant disclosure being powered by the low-voltage power source. As shown in FIG. 6B, when the switching unit 641 in FIG. 6A is turned off (open), the light-emitting diode units 61 may receive the power from the high-voltage power source 66 and may be in the serial connection mode. Dotted lines in FIG. 6B show the power transmission path for the light-emitting diode units 61 in serial connection mode. On the other hand, when the switching unit 641 is turned on (closed), the light-emitting diode units 61 may be powered by the low-voltage power source 63 and is placed in parallel connection mode. Dotted lines in FIG. 6C indicate that the power transmission path for the light-emitting diode units 61 is in the parallel connection mode.

Fourth Embodiment of the Instant Disclosure

Figure 7:
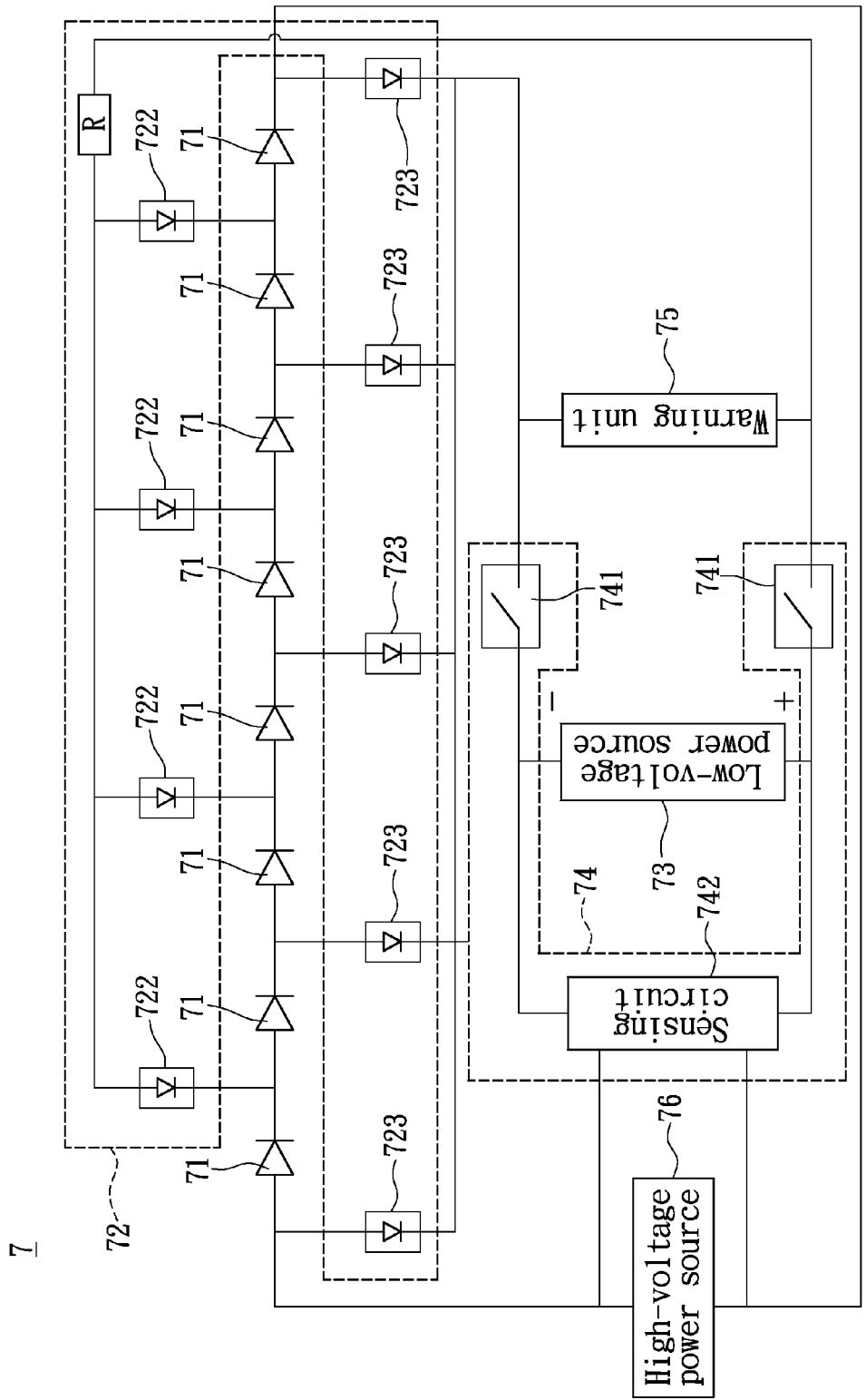
FIG. 7 illustrates a simplified circuit diagram of a light-emitting device according to the fourth embodiment of the instant disclosure.

FIG. 7 illustrates a simplified circuit diagram of a light-emitting device 7 according to the fourth embodiment of the instant disclosure. The light-emitting device 7 may include a plurality of light-emitting diode units 71, a switching circuit 72 having multiple switching units 722-723, a low-voltage power source 73, a control module 74 having a switching unit 741 and a sensing circuit 742, and a warning unit 75.

The light-emitting device 7 is substantially similar to the embodiments presented in the above, except the light-emitting diode units 71 are implemented in terms of the traditional light-emitting diodes, or the high-voltage light-emitting diodes (HV LEDs).

When the high-voltage power source 76 powers the light-emitting diode units 71, the light-emitting diode units 71 may be in the serial connection mode. When the unavailability of the high-voltage power source 76 is detected by the control module 74, the low-voltage power source 73 may serve to deliver the power to the light-emitting diode units 71. As the light-emitting diode units 71 could be in the form of DC-based light-emitting diode units, only half of the light-emitting diode units 71 (even-numbered ones or odd-numbered ones) could be conducted when the low-voltage power source 73 delivers the power to the light-emitting diode units 71. With the reduced number of the light-emitting diode units 71 being conducted at the time the low-voltage power source 73 delivers its power, whether the high-voltage power source or the low-voltage power source serves as the source of the power may be recognized with ease. It's not easy to understand.

In summary, the light-emitting diode circuit and the light-emitting device are capable of operating under two power modes, which are based on two distinct power sources (e.g., a high-voltage power source and a low-voltage power source). When the high-voltage power source (also referred to as the first power source) delivers the power to the LED units, the LED units may be configured in a serial conduction mode. And when the low-voltage power source (or referred to as the second power source) delivers the power to the LED units, the LED units may be configured into a parallel conduction mode.

In the event that the high-voltage power source is an AC power source and the low-voltage power source is a DC power source, the light-emitting device may be suitable for the purpose of general lighting. The control module of the light-emitting device may be having the timer incorporated or detecting the availability of the high-voltage power source in order to switch the delivery of the power among the different power sources. Meanwhile, when the LED units are powered by the low-voltage power source the control module may trigger the operation of the warning unit.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A light-emitting device comprising:
a plurality of sequentially connected LED units electrically connected to a first power source with a first power voltage;
a switching circuit electrically coupled to the LED units;
a second power source configured to provide with a second power voltage at a lower voltage value than the first power voltage, the second power source electrically coupled to the LED units through the switching circuit;
a control module in connection with the switching circuit for controlling the switching circuit to selectively switch power delivery from the first power source and the second power source to the light-emitting diode units;
wherein when the first power voltage is delivered from the first power source to the LED units, the control module controls the switching circuit to establish serial connection between the LED units,
wherein when the second power voltage is delivered from the second power source to the LED units, the control module controls the switching circuit to establish parallel connection between the LED units.

2. The light-emitting device according to claim 1, wherein the control module further comprises a timer, the control module determines selection of power delivery between the first power source and the second power source to the LED units basing on the timer.

3. The light-emitting device according to claim 1, wherein the control module controls the switch circuit according to power delivery availability of the first power source, wherein when the control module senses a power delivery interruption from the first power source, the control module controls the switching circuit to switch power delivery from the first power source to the second power source for powering the LED units and establish parallel connection there-between, wherein when the control module senses the availability of power delivery from the first power source, the control module controls the switching circuit to switch power delivery from the second power source to the first power source for powering the LED units and establish series connection there-between.

4. The light-emitting device according to claim 3, wherein the control module is implemented in terms of a relay, the relay further comprises a sensing circuit and at least one switch, the sensing circuit is provided for detecting output voltage of the first power source, and the relay controls the switching circuit through the switch to selectively establish series and parallel connection between the LED units.

5. The light-emitting device according to claim 1,
wherein the second power source comprises a positive output terminal and a negative output terminal,
wherein each of the LED units comprises a first end and a second end, and
wherein the switching circuit comprises:
a plurality of first switching units electrically coupled between the positive output terminals and the respective first ends of the odd-numbered LED units, and
a plurality of second switching units electrically coupled between the negative output terminals and the respective second ends of the odd-numbered LED units,
wherein the LED units establish parallel connection when the first switching units and the second switching units are closed.

6. The light-emitting device according to claim 5, wherein at least one of the first switching units or the second switching units is a diode or a LED.

7. The light-emitting device according to claim 1, the light-emitting device further comprising
a warning unit connected to the control module, wherein when the LED units are powered by the second power source, the control module triggers the warning unit to alarm for several minutes.

8. The light-emitting device according to claim 1, wherein each of the LED units is an AC LED module having two LED components or at least five LED components, the two LED components are connected in parallel and have opposite forward-bias current direction, the at least five LED components are connected in a bridge fashion.

9. The light-emitting device according to claim 8, wherein the first power source is an AC power source, the AC power source is provided for powering on the AC LED modules, all of the LED components in the AC LED modules are alternatively conducted to emit light according an AC signal of the AC power source.

10. The light-emitting device according to claim 8, wherein the second power source is a DC power source, the DC power source is provided for powering on the AC LED modules, some of the LED components in the AC LED modules are conducted to emit light according to a DC signal of the DC power source.

11. A light-emitting diode circuit, comprising:
N sequentially connected LED units electrically coupled to a first power source, wherein N is equal to or larger than two; and
N+1 switching units alternatively connected between the sequentially arranged LED units, wherein the LED units are electrically coupled to a second power source through the switching units;
wherein when the first power source delivers power to the LED units, the LED units are in a serial conduction mode, and
wherein when the second power source delivers power to the LED units, the LED units are in a parallel conduction mode.

12. The light-emitting diode circuit according to claim 11, further comprising a control module configured to selectively switch power delivery between the first power source and the second power source for powering the LED units.

13. The light-emitting diode circuit according to claim 12, wherein the control module further comprises a timer, wherein the control module determines selection of power delivery between the first power source and the second power source to the LED units according to the timer.

14. The light-emitting diode circuit according to claim 12, wherein the control module controls the N+1 switching units according to power delivery availability of the first power source, wherein the control module senses a power delivery interruption from the first power source, the control module controls the switching units to switch power delivery from the first power source to the second power source for powering the N LED units and establish parallel connection there-between, wherein when the control module senses the availability of power delivery from the first power source, the control module controls the switching units to switch power delivery from the second power source to the first power source for powering the N LED units and establish series connection there-between.

15. The light-emitting diode circuit according to claim 12 wherein the control module is implemented in terms of a relay, wherein the relay further comprises a sensing circuit and at least one switch, the sensing circuit is provided for sensing output voltage of the first power source, and the relay controls the switching units through the switch so as to selectively establish series and parallel connection between the N LED units.

16. The light-emitting diode circuit according to claim 12, wherein at least one of the N+1 switching units is a diode or a LED.

17. The light-emitting diode circuit according to claim 12, the light-emitting diode circuit further comprising
a warning unit connected to the control module, wherein when the LED units are powered by the second power source, the control module triggers the warning unit to alarm for several minutes.

18. The light-emitting diode circuit according to claim 11, wherein each of the LED units is an AC LED module having two LED components or at least five LED components, the two LED components are connected in parallel and have opposite forward-bias current direction, the at least five LED components are connected in a bridge fashion.

19. The light-emitting diode circuit according to claim 18, wherein the first power source is an AC power source, the AC power source is provided for powering on the AC LED modules, all of the LED components in the AC LED modules are alternatively conducted to emit light according to an AC signal of the AC power source.

20. The light-emitting diode circuit according to claim 18, wherein the second power source is a DC power source, the DC power source is provided for powering on the AC LED modules, some of the LED components in the AC LED modules are conducted to emit light according to a DC signal of the DC power source.

* * * * *